United States Patent [19]

Campbell

[11] Patent Number: 4,514,122

[45] Date of Patent: Apr. 30, 1985

[54] PRESSURE FOOT FOR MACHINE TOOL

[76] Inventor: James H. Campbell, 1210 W. Alameda, Suite #108, Tempe, Ariz. 85282

[21] Appl. No.: 431,318

[22] Filed: Sep. 30, 1982

[51] Int. Cl.³ .............................................. B23C 9/00
[52] U.S. Cl. .............................. 409/190; 144/134 A; 144/144 R; 409/903
[58] Field of Search ............... 409/189, 190, 233, 903, 409/235, 80; 144/134 A, 134 R, 134 B, 134 C, 136 R, 252 R, 144 R; 408/95; 83/460, 388, 925 CC

[56] References Cited

U.S. PATENT DOCUMENTS

| | | | |
|---|---|---|---|
| 3,332,462 | 7/1967 | Williams | 144/144 X |
| 3,587,391 | 6/1971 | Pitts | 409/235 |
| 3,770,031 | 11/1973 | Olson | 409/189 X |
| 4,037,982 | 7/1977 | Clement | 409/190 X |
| 4,158,987 | 6/1979 | Smith | 409/190 X |
| 4,443,141 | 4/1984 | Kosmowski | 409/190 |

FOREIGN PATENT DOCUMENTS 2065730  7/1975  Fed. Rep. of Germany ........ 83/925 CC

*Primary Examiner*—William R. Briggs
*Attorney, Agent, or Firm*—Warren F. B. Lindsley

[57] ABSTRACT

An improved pressure foot contact assembly comprising a small number of plastic parts provided to replace a more complex and expensive contact assembly employed in a prior art pressure foot for a routing machine. In the preferred embodiment, a slotted cylindrical plastic member forms a spring biasing means which has a larger life and replaces numerous more expensive parts of the prior art structure.

11 Claims, 6 Drawing Figures

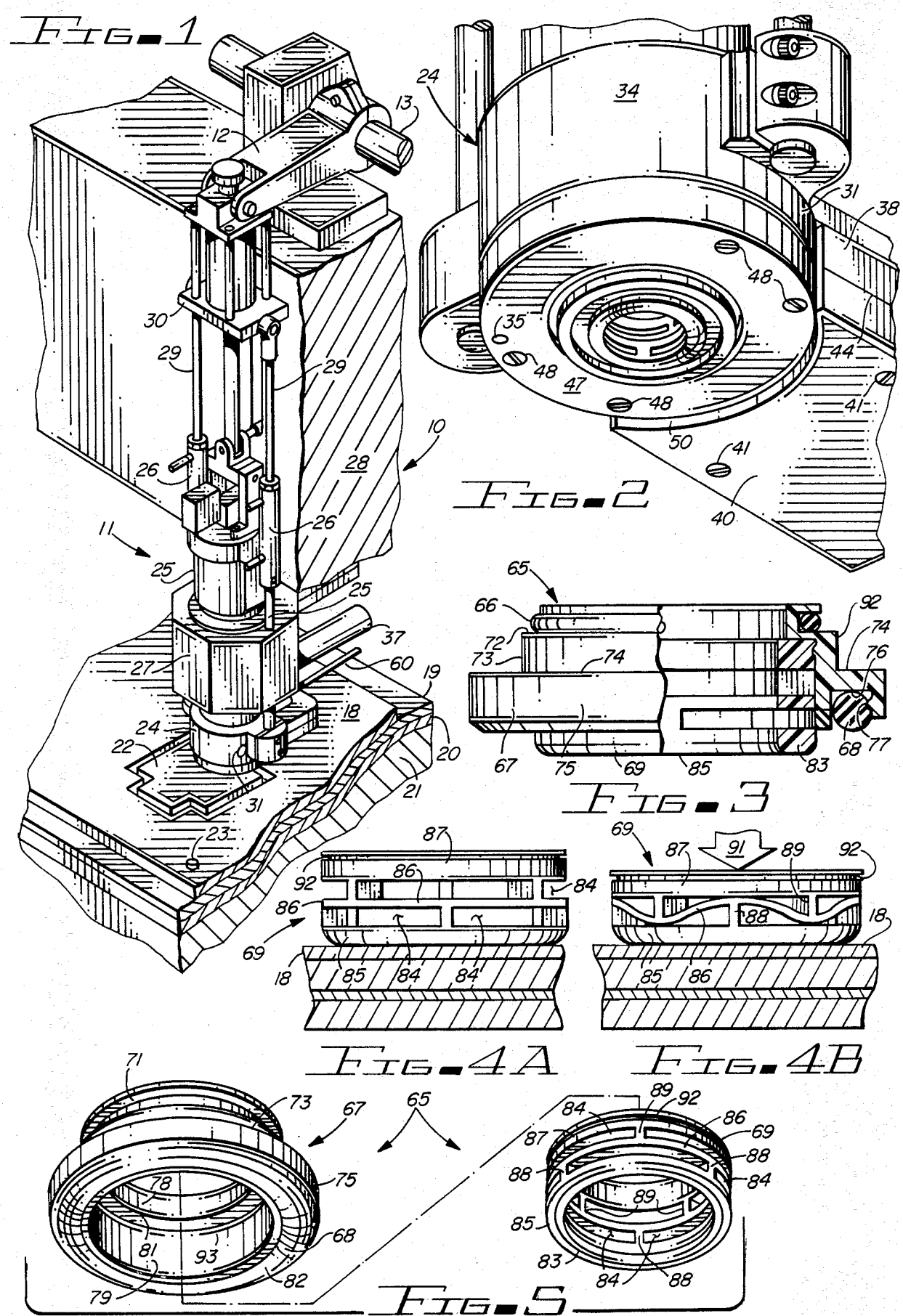

PRESSURE FOOT FOR MACHINE TOOL

BACKGROUND OF THE INVENTION

This invention relates to a means for holding the workpiece being cut by a machine tool, such as a router, so as to prevent movement of the cutout portion of the workpiece in the last increment of the cut.

DESCRIPTION OF THE PRIOR ART

In the operation of automatic routing machines, it is conventional to position a stack of workpieces, such as those used in producing printed circuit boards, on the worktable, holding them in place by tooling pins which extend through openings in the workpieces. For accuracy, there is a close fit between the tooling pins and the workpieces at the openings so that there is no clearance around the pins to permit relative lateral movement. It has been necessary to provide these tooling pins in the portions of the workpieces, which are cut out, as well as the portions outside of the cut line, because otherwise the cutout portions will be moved laterally during the cutting operation and an accurate cut will not be produced. The lateral movement of the cutout portion will occur during the last increment of the cut, arising from the lateral force produced by the router bit as the worktable is moved relative to the spindle. Prior to that time, the portion of the workpiece to be cut out will be joined to the portion outside of the cut line by sufficient material to prevent relative movement. When the cut is nearly complete, however, the connecting portion becomes very small and lacks the strength to withstand the lateral force of the router. Thus, unless it has been held by tooling pins or other auxiliary clamping members, the cutout portion will break off or move in any event as the connecting portion is cut through and its edge will not be accurately formed.

The necessity for using tooling pins in the cutout portions has substantially increased the production time for the machine. The drilling of the various holes for the tooling pins and the close tolerances required take a substantial amount of the operator's time in preparing the workpieces for routing and installing them on the worktable. After the routing operation is complete, additional time is expended in prying the cutout parts off of the tooling pins that hold them. Consequently, the production rate of a routing machine has been slowed and expenses have been increased because of the need for pinning the portions of the workpieces to be cut out.

Recently, the need for the tooling pins in the cut-out portion has been removed through the use of a pressure foot. The pressure foot, as described in U.S. Pat. No. 4,158,987, the disclosure of which is incorporated herein by reference, comprises a frictional clamping arrangement which holds the workpiece being cut by the router so as to prevent movement of the cutout portion of the workpiece in the last increment of the cut. The device includes a pressure foot having a clamping member which is forced downwardly against the surface of the workpiece when the cut is nearly completed. The clamping member holds the cutout portion of the workpiece motionless relative to the worktable so as to prevent its lateral movement during completion of the cut. The clamping member is fixed relative to the spindle during the principal part of the cut, but is released for limited movement relative to the spindle when holding the workpiece.

While the prior art pressure foot contributes substantially toward the optimization of the routing process, it has been found to be relatively expensive to manufacture because of its use of machined metallic parts. It also comprises a relatively large number of parts which are subject to wear and thus require replacement at too frequent intervals.

SUMMARY OF THE INVENTION

The present invention comprises an improved pressure foot which overcomes the deficiencies of the prior art and like the prior art holds the cutout portions of the workpieces without the use of tooling pins or other auxiliary clamps. The efficiency of the routing machine is thus materially improved and the production rate is increased thereby reducing production costs.

In accordance with the teachings of this invention, a member is provided on the routing machine which is forced against the workpiece to clamp it against the worktable during the time that the final part of the cut is made. This member holds the cutout portion of the workpiece at the critical time and leaves it entirely free for removal from the machine after completion of the routing cycle.

In carrying out the invention, a housing is provided around the spindle and router bit, the lower portion of which is a slide member, which is movable laterally relative to the housing. This movement ordinarily is prevented by a locking pin arrangement which extends through an opening in the slide member, but which can be withdrawn to release the slide. As disclosed herein, a sleeve is mounted on the slide member which circumscribes the router bit and comprises an annular member that is held against the surface of the workpiece during routing. This is accomplished by a downward force on the housing. As disclosed, the annular member is formed of a plastic designed to provide a resilient spring like action which is forced against the workpiece to hold it flat against the worktable as the worktable moves relative to the spindle in producing the cut in the workpiece and compensating for any warpage of the workpiece.

The slide member further comprises a second annular plastic member of a larger diameter than the first. When the cut is nearly complete, this second annular member is pressed firmly against the workpiece encircling the router bit so that as it is pressed against the workpiece, it engages both the outside portion and the cutaway portion of the workpiece. Because of the relatively larger diameter and hence the larger pressure contact surface area afforded by the second annular member, a considerably larger frictional force is provided thereby which resists relative motion between the annular member and the two parts of the workpiece. Simultaneously with the forcing of the housing downwardly, the pin or pins are withdrawn from the slide member, as disclosed in U.S. Pat. No. 4,158,987 and FIG. 3 thereof, so that it can move laterally relative to the housing. As the worktable proceeds to move laterally relative to the router for completing the cut, the slide member remains stationary relative to the worktable. Because of the high friction afforded by the larger diameter annular member, the slide member holds the cutout portion of the workpiece motionless relative to the workpiece. As this takes place, the slide member moves laterally relative to the spindle.

Upon completion of the routing operation, the head of the machine is raised, lifting the housing and associated elements away from the workpiece, with its cutout portion then being free for removal from the machine. Centering springs return the slide member to its original position and the pin is reinserted in the opening in the slide member preparatory for the next cutting operation.

The improved pressure foot constitutes an improvement over the prior art pressure foot because of its lower cost and more durable construction.

It is, therefore, one object of the present invention to provide an improved pressure foot for a machine tool such as a router.

Another object of the invention is to provide such a pressure foot in a form that utilizes fewer parts.

A further object of the invention is to provide such a pressure foot in which most of the parts may be inexpensively molded from a durable plastic material.

A still further object of the invention is to provide such a pressure foot in a form that utilizes no metallic parts.

A still further object of the invention is to provide such a pressure foot in a form that minimizes wear and hence, the frequency of repair or replacement.

Yet another object of the invention is to provide such a pressure foot for which the initial and maintenance costs are appreciably lower than those of prior art devices.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a perspective view of a routing machine incorporating the present invention;

FIG. 2 is an enlarged perspective view of a portion of the routing machine of FIG. 1 including the spindle and the pressure foot of the invention;

FIG. 3 is an enlarged side view of the pressure foot of the invention with a portion of one side partially cut away to reveal details of construction;

FIG. 4A is a side view of a first annular member with its integral spring, the view showing the annular member pressing lightly against the surface of the workpiece;

FIG. 4B is a side view of the same annular member pressing firmly against the workpiece with the integral spring compressed by the applied force; and FIG. 5 is an exploded perspective view showing the separate parts of the pressure foot of FIGS. 3 and 4.

DESCRIPTION OF THE PREFERRED EMBODIMENT

Referring more particularly to the drawing by characters of reference, FIG. 1 discloses a routing machine 10 comprising a spindle assembly 11 mounted at the outer end of a crank arm 12. The latter element is keyed to a rotatable shaft 13. Consequently, rotation of shaft 13 causes crank arm 12 to pivot for raising or lowering the spindle assembly 11.

At the lower end of assembly 11, a spindle and collet, which is hidden from view and well known in the art, is provided for carrying a router bit. The latter element is used in cutting a workpiece or a stack of workpieces 18 positioned over a subplate 19 on the upper surface of a tooling plate 20. A worktable 21 supports the tooling plate and is movable laterally in a horizontal plane. In this manner, the router bit is able to cut out finished parts, such as the part 22, shown in FIG. 1.

The stack of workpieces 18 is held on the tooling plate merely by the use of tooling pins 23 located in areas remote from where the parts 22 are cut out. The cutout parts 22 are not held by the tooling pins 23 and are so unrestrained upon being severed from the workpiece 18. In conventional router use, it would be necessary to include additional tooling pins at the locations of the parts 22 to assure accuracy of cut by preventing part movement at the last portion of the cut. These extra tooling pins are eliminated by the present invention.

A pressure foot 24 is located at the lower end of the spindle assembly 11, carried by two shafts 25, which at their upper ends are connected to a pair of pneumatic cylinders 26. The shafts 25 pass through bearings in a housing 27 that is fixed relative to the beam 28 on which the spindle assembly 11 and crank arm 12 are mounted. The piston rods 29 of the cylinders 26 project from the upper ends of the cylinders and are connected to a transverse plate 30 at the upper portion of the spindle assembly. Consequently, the pressure foot 24 can be moved vertically relative to the spindle assembly 11 by actuation of the pneumatic cylinders 26. This movement is produced by displacing the cylinders 26 axially, which causes similar movement of the shafts 25.

The housing 31 of the pressure foot is shaped to provide a chamber that receives the lower motor drive portion of the spindle assembly and extends below this portion to an open area in the vicinity of the collet.

A cover 34 is connected by a hinge pin 35 to housing 31, cooperating with the housing to give the chamber a cylindrical configuration. An outlet passageway in housing 31 extends from the chamber to a hose 37 which is connected to a source of a vacuum for evacuating the cuttings produced during the routing operation.

Housing 31 includes a horizontal rearward extension 38 to the undersurface of which is attached a plate 40 by screws 41. The upper surface of plate 40 is recessed to provide a chamber having a flat bottom wall which is parallel to the upper edge 44 of the plate. In the vicinity of the spindle, the bottom surface of housing 31 is recessed vertically and engaged by the upper surface of an annular member 47 which is secured to the housing by screws 48. The outer circumferential wall of the annular member 47 engages the curved inner edge 50 of bottom plate 40, as well as similarly curved edge of the housing which is aligned with edge 50.

Contained within a common chamber formed inside housing 31 and extension 38 just above member 47 and plate 40, as shown in U.S. Pat. No. 4,158,987, is a flat horizontal slide plate, the under surface of which rests on the top surface of plate 40. This slide plate has a circular opening in the area of housing 31 that surrounds the spindle and collet axis and is urged in to a concentric position therewith by four springs arranged in the horizontal plane at ninety degree intervals. The concentric position of the slide plate may be secured by actuating a piston via a compressed air line 60, the piston being arranged to drive a pin through the slide plate to restrain its motion.

The apparatus described to this point is in common with the prior art of U.S. Pat. No. 4,158,987 and is described in greater detail therein. The prior art patent further incorporates a pressure foot contact assembly comprising a set of springs, O-rings, sleeves and other parts which is carried by the sliding plate and which engages the surface of the workpiece 18 during the routing process. The contact assembly glides over the surface of the workpiece during the major part of the routing operation but is pressed firmly against the surface of the workpiece during the last instant of the operation to engage the surface and to secure the position of the cutout portion 22 relative to the remainder of the workpiece as the last part of the cut is made. The contact assembly of the prior art patent comprises eleven separate parts, many of which are machined metal parts which add significantly to the cost of the assembly. In the present invention, this complex and expensive contact assembly is replaced by an improved contact assembly that comprises only four parts, one of which is a standard rubber or neoprene O-ring, and the remainder are inexpensively molded parts of Delrin plastic.

The construction of the improved pressure foot contact assembly 65 of the present invention is shown in FIGS. 3–5 and comprises a plastic sleeve or housing 67 having a standard rubber or neoprene O-ring 66 mounted around it at its narrow end and a plastic O-ring 68 mounted around it at its other end. A plastic spring insert 69 is inserted in the hollow interior of the housing. Parts 67, 68 and 69 are preferably formed of a plastic material commonly known as Delrin.

Housing 67 is generally cylindrical in form with inside and outside diameters that are increased in steps from the smaller upper end to its larger lower end. The outside surface of the housing having the smallest diameter is provided with an annular groove 71 within which the rubber O-ring 66 is mounted. The outer surface of housing 67 forms a first step to a cylindrical surface 73 of an intermediate diameter immediately below groove 71 forming a first shoulder 72. A second step of the housing then extends to a still larger diameter from the base of surface 73 to form a second shoulder 74 and a still larger outside cylindrical surface 75. Surface 75 continues to the base of the housing with its flat annular horizontal undersurface forming an annular groove 76. Groove 76 has a generally rectangular cross-section with a small annular porjection 77 extending inwardly of the outside periphery of the groove for holding an O-ring 68 therein. Housing 67 is provided with a small diameter cylindrical interior opening 78 at its top and a larger diameter cylindrical interior opening 79 at its bottom, as shown in FIG. 5. The transition from the smaller diameter to the larger diameter forms a horizontal inside shoulder 81.

O-ring 68, which may be formed of Delrin, is specially formed to fit inside groove 76 of housing 67. Its cross-section, although shown in a round configuration, may be rectangular in shape having an exposed arcuate lower surface 82. The ring may also contain an annular depression near the top of its outer cylindrical surface that cooperates in a locking action with O-ring 68 when it is in place within groove 76.

The plastic spring insert 69 mounted in housing 67 comprises a cylinder, the lower surface 83 of which is rounded for engaging and applying pressure to a workpiece and permitting a gliding frictionless motion over surface 83 as the workpiece is moved laterally relative to the pressure foot.

The cylindrical walls of insert 69 are specially formed to effect a resilient spring compression and expansion action longitudinally of its cylindrical axis and that of the pressure foot. This is accomplished by forming a number of circumferential slots 84 in its outer periphery which forms the cylindrical surface of the insert into a stack of cylindrical rings each formed in a plurality of segments, as shown in FIG. 4A. Thus, insert 69 comprises a rounded base 85, an intermediate ring or disc 86 forming a plurality of closed slotted segments and an upper similar ring 87. Base 85 of the insert is joined to intermediate ring 86 by three bridging webs or columns 88 which are uniformly spaced about the circumference of insert 69 at 120 degree intervals. In the same manner, intermediate disc 86 is joined to the upper ring 87 by three columns 89. Columns 89 are again spaced at 120 degree intervals and are staggered relative to the three columns 88 at 60 degree displacements therefrom. The inner disc 86 is quite thin so that as the insert 69 is depressed axially, disc 86 will deform to provide the desired compressing spring action. The spring action is illustrated by FIGS. 4A and 4B. In FIG. 4A with no axial force applied, inner disc 86 is flat and planar. When an axial force 91 is applied, as shown in FIG. 4B, inner disc 86 deforms into a wave configuration. The strong tendency for Delrin plastic material, of which disc 86 is formed, to return to its flat undistorted form contributes to the desired spring action.

The outside cylindrical surface of the upper ring 87 is dimensioned to fit inside the larger diameter opening 79 of housing 67. An annular depression 92 around the top edge of the cylindrical outer surface of ring 87 cooperates in a locking action with a mating projection 93 near the top of the cylindrical surface of opening 79 so that insert 76 may be inserted and secured in place thereby within housing 67.

The assembly of the contact assembly 65 is as follows:

The rubber O-ring 66 is first slipped over the upper end of housing 67 to a position in which it is held within groove 71. The Delrin O-ring 68 is installed in groove 76 with pressure applied to effect the snap-in locking action made possible by projection 77 of groove 76 and the cooperating depression in the outer surface of O-ring 68. Insert 69 is then installed in opening 79 of housing 67 with the upper ring 87 entering into opening 79 first and with pressure applied axially to the insert and a locking action occurs between groove 92 of insert 69 and projection 93 of housing 67. As shown in FIG. 3, the lower end of insert 69 and the rounded undersurface of ring 85 extend below the lower end of housing 67 in the absence of any compressive force.

The assembled contact assembly 65 may then be installed in the pressure foot 24 by simply passing the upper end of housing 67 through an opening in member 47. As the O-ring 66 passes through this opening, it enters a circular opening in the horizontal slide plate which, as described earlier and more clearly shown in U.S. Pat. No. 4,158,987, the disclosure of which is incorporated herein by reference, is positioned directly above member 47. The O-ring 66 fits with interference inside the opening of the slide plate and the shoulder 72 immediately below O-ring 66 rests against the undersurface of the slide plate. The surface 75 of housing 67 fits inside the opening in member 47 with sufficient clearance to afford the desired horizontal motion between assembly 65 and spindle assembly 11. When the assembly 65 is installed, shoulder 74 rests lightly against the undersurface of member 47, and the router bit extends through the center of insert 69 to access the surface of the workpiece.

In the utilization of the improved pressure foot contact assembly 65 as a working member of the routing machine 10, the routing operation is initiated with the slide plate pinned in position with respect to the spindle of the router so that the contact assembly is constrained to remain fixed relative to the router bit. The vertical pressure applied to insert 69 is minimal during this time so that its plastic spring arrangement is only partially compressed. In this condition, the larger Delrin O-ring 68 does not touch the surface of the workpiece but insert 69 presses gently and glides smoothly over it. At the last instant of the cut that separates cutout part 22 from the remainder of the workpiece 82, additional vertical pressure is applied to contact assembly 65 and the slide plate is simultaneously released by withdrawal of the pin that had secured its position. The additional vertical pressure collapses the spring arrangement of insert 69 so that the large Delrin O-ring 68 is driven firmly against the surface of workpiece 18 including a portion of the cutout part 22. The frictional contact between O-ring 68 and the contacted surfaces prevents relative motion between part 22 and the remainder of the workpiece 18 during the last increment of the cut and the released slide plate on which the contact assembly 65 is mounted moves against its restraining springs to follow the motion of the workpiece. Upon completion of the cut, portion 22 is removed and the workpiece repositioned for the next routing operation.

The considerably simpler and less expensive contact assembly 65 of the invention is thus shown to incorporate the functionality of the more complex prior art assembly of U.S. Pat. No. 4,158,987, which it replaces. The durable Delrin plastic material from which its major parts are formed assures minimum wear and long life so that maintenance costs are also minimized in accordance with the stated objects of the invention.

Although but a single embodiment of the invention has been illustrated and described, it will be apparent to those skilled in the art that various changes and modifications may be made therein without departing from the spirit of the invention or from the scope of the appended claims.

What is claimed is:

1. A device for mounting around a spindle assembly of a machine tool for holding a workpiece during a cutting operation comprising:
    an open ended cylindrical housing,
    said housing defining a chamber for positioning around said spindle assembly and having a projecting annular face at one end thereof for positioning adjacent a workpiece, and
    an open ended hollow annular member mounted within said chamber and having one end thereof extending outward of said projecting annular face of said housing,
    the outer periphery of said annular member defining a wall having at least one circumscribing slot divided into at least two segments which are separated by web means extending substantially longitudinally of said annular member,
    said housing when moved to position said annular face against the workpiece compressing said annular member by laterally distorting the wall of said annular member forming said slot.
2. The device set forth in claim 1 wherein:
    said annular member is formed of a plastic.
3. The device set forth in claim 1 wherein:
    said annular member is formed of a plastic known by the trade name Delrin.
4. The device set forth in claim 1 wherein:
    said annular member comprises a cylindrical configuration.
5. The device set forth in claim 2 wherein:
    said annular member is provided with a pair of parallelly arranged circumscribing slots, each divided into a plurality of segments which are separated by web means extending substantially longitudinally of said annular member,
    said segments of one slot being offset from the segments of the other slots, and
    the wall of said annular member forming said slots distorting laterally of its length during compression of said annular member.
6. The device set forth in claim 1 wherein:
    said annular face of said housing is provided with an annular slot, and
    a ring inserted in said slot having an arcuate exposed surface for engaging the workpiece.
7. The device set forth in claim 6 wherein:
    said ring is formed of a plastic material.
8. The device set forth in claim 6 wherein:
    said housing, annular member and said ring are formed of a plastic material.
9. The device set forth in claim 5 wherein:
    said housing and ring are formed of a plastic material.
10. The device set forth in claim 9 wherein:
    said housing, annular member and ring are formed of a plastic material known by the trade name Delrin.
11. The device set forth in claim 10 wherein:
    the diameter of said annular face of said housing at the workpiece engaging end is greater than the other end of said housing, and
    said other end of said housing is grooved annularly thereof to receive an O-ring.

* * * * *